United States Patent
Lotter

(10) Patent No.: US 12,501,369 B2
(45) Date of Patent: Dec. 16, 2025

(54) SYSTEM TO ENABLE HIGH POWER USER EQUIPMENT CAPABILITIES

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

(*) Notice: Subject to any disclaimer, the term of this patent is extended or adjusted under 35 U.S.C. 154(b) by 0 days.

(21) Appl. No.: 19/227,776

(22) Filed: Jun. 4, 2025

(65) Prior Publication Data

US 2025/0374205 A1 Dec. 4, 2025

Related U.S. Application Data

(60) Provisional application No. 63/655,898, filed on Jun. 4, 2024.

(51) Int. Cl.
*H04W 88/02* (2009.01)
*H04W 52/24* (2009.01)

(52) U.S. Cl.
CPC ....... *H04W 52/248* (2013.01); *H04W 52/243* (2013.01); *H04W 88/02* (2013.01)

(58) Field of Classification Search
CPC ..... H04W 24/02; H04W 28/02; H04W 28/04; H04W 28/08; H04W 52/14; H04W 52/18; H04W 52/34; H04W 72/00; H04W 72/04; H04W 72/12; H04W 76/15; H04W 8/24; H04W 84/20; H04W 24/08; H04W 52/28; H04W 64/00; H04W 72/02; H04W 72/044; H04W 72/0453; H04W 72/1268; H04W 72/543; H04W 72/563; H04W 88/06; H04W 52/36; H04W 52/52; H04W 52/42; H04W 92/10; H03G 3/30; H03F 1/02; H03F 3/24; H03F 3/195; H03F 3/21; H03F 3/19;

(Continued)

(56) References Cited

U.S. PATENT DOCUMENTS 10,834,685 B1 * 11/2020 Singh .................. H04W 52/245
2021/0099136 A1 * 4/2021 Drogi ..................... H03F 3/245

OTHER PUBLICATIONS

International Searching Authority (US); "Notification of Transmittal of the International Search Report and The Written Opinion of the International Searching Authority, or the Declaration" dated Jul. 25, 2025; PCT Application No. PCT/US25/32233; pp. 1-7; (2025).

* cited by examiner

*Primary Examiner* — Tu X Nguyen
(74) *Attorney, Agent, or Firm* — FisherBroyles LLP; James P. Cleary

(57) ABSTRACT

A system and method for enabling high power user equipment (HPUE) capabilities in a wireless communication device. A system includes a cellular module configured to output a transmit signal at a standard power level, and a variable gain amplifier stage coupled to an antenna output of the cellular module, the variable gain amplifier stage configured to amplify the transmit signal. The system further includes a gain control system coupled to the variable gain amplifier stage, the gain control system configured to adjust a gain of the variable gain amplifier stage based on an input power of the transmit signal, wherein the gain is adjusted at a rate slower than a power control loop between the cellular module and a base station. The system further includes an antenna coupled to an output of the variable gain amplifier stage, the antenna configured to transmit the amplified transmit signal.

20 Claims, 2 Drawing Sheets

(58) Field of Classification Search
CPC . H03F 3/213; H03F 3/193; H03F 1/30; H03F 1/32; H03F 1/07; H03F 1/56; H03F 3/68; H03F 3/72; H04B 1/40; H04B 1/04; H04B 1/3827; H04B 7/06; H04B 1/00; H04B 7/0452; H04B 1/16; H04B 17/12; H04B 17/14; H04B 17/21; H04B 17/327; H04B 17/364; H04B 7/0456; H04B 1/10; H04B 1/18; H04B 1/38; H04B 17/10; H04B 7/04; H04B 7/0408
See application file for complete search history.

SYSTEM TO ENABLE HIGH POWER USER EQUIPMENT CAPABILITIES

BACKGROUND

The present disclosure generally pertains to wireless communication devices, and is more particularly directed towards a portable wireless access point. Specifically, the present disclosure is directed to a system and method for enabling high power user equipment (HPUE) capabilities.

SUMMARY

This document describes a system that can be added to any cellular module using standard cellular modem software and firmware, without any modification to the existing cellular module, by adding a variable gain section at the output of the cellular module that is switched into the system at a rate slower than the standard power control loop that exists between the cellular modem and the base station. This allows the extra gain and extra output power to affect the system in a similar way as multipath fading.

In some aspects, a system for enabling high power user equipment (HPUE) capabilities in a wireless communication device. A system includes a cellular module configured to output a transmit signal at a standard power level, and a variable gain amplifier stage coupled to an antenna output of the cellular module, the variable gain amplifier stage configured to amplify the transmit signal. The system further includes a gain control system coupled to the variable gain amplifier stage, the gain control system configured to adjust a gain of the variable gain amplifier stage based on an input power of the transmit signal, wherein the gain is adjusted at a rate slower than a power control loop between the cellular module and a base station. The system further includes an antenna coupled to an output of the variable gain amplifier stage, where the antenna is configured to transmit the amplified transmit signal.

In other aspects, a method for enabling high power user equipment (HPUE) capabilities in a wireless communication device includes the steps of receiving a transmit signal from an antenna output of a cellular module, the cellular module operating with standard cellular modem software and firmware, and measuring an input power of the transmit signal. The method further includes adjusting a gain of a variable gain amplifier stage based on the measured input power, wherein the gain is adjusted at a rate slower than a power control loop between the cellular module and a base station. The method further includes amplifying the transmit signal using the variable gain amplifier stage, and transmitting the amplified transmit signal via an antenna.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The system described in this disclosure is related to systems and methods previously disclosed in U.S. patent application Ser. No. 18/641,131, filed Apr. 19, 2024, and U.S. patent application Ser. No. 18/387,430, filed Nov. 16, 2023, the disclosures of which are incorporated by reference herein for all purposes, and which describe systems that can be added to a standard cellular module to enable it to transmit at higher power levels that are typically associated with 3GPP Power Class 1 systems. In the previous disclosures, the RF signal is processed by a new High Power Amplifier (HPA) that required a control signal to be sent from the cellular module to control the HPA.

The system and method described herein can be used to enhance the transmit power of standard cellular modules, typically operating at 3GPP Power Class 3 levels (e.g., up to 23 dBm for LTE), to achieve performance akin to Power Class 1 systems (e.g., up to 31 dBm). This is accomplished by integrating a variable gain section at the output of the cellular module, controlled in a manner that aligns with the dynamics of the cellular network's power control loop. The system is designed to be non-invasive, meaning it can be retrofitted to existing cellular modules without altering their internal software, firmware, or hardware architecture. This makes the invention highly versatile for applications in portable wireless access points, IoT devices, vehicular communication systems, and other cellular-enabled devices requiring extended range or improved signal reliability.

In this disclosure, a system is described that can be added to any cellular module using standard cellular modem software and firmware (typically power class 3), without any modification to the existing cellular module. This behavior is made possible by adding a variable gain section at the output of the cellular module that is switched into the system at a rate slower than the standard power control loop that exists between the cellular modem and the base station. This allows the extra gain and extra output power to affect the system in a similar way multipath fading does.

Figure 1:
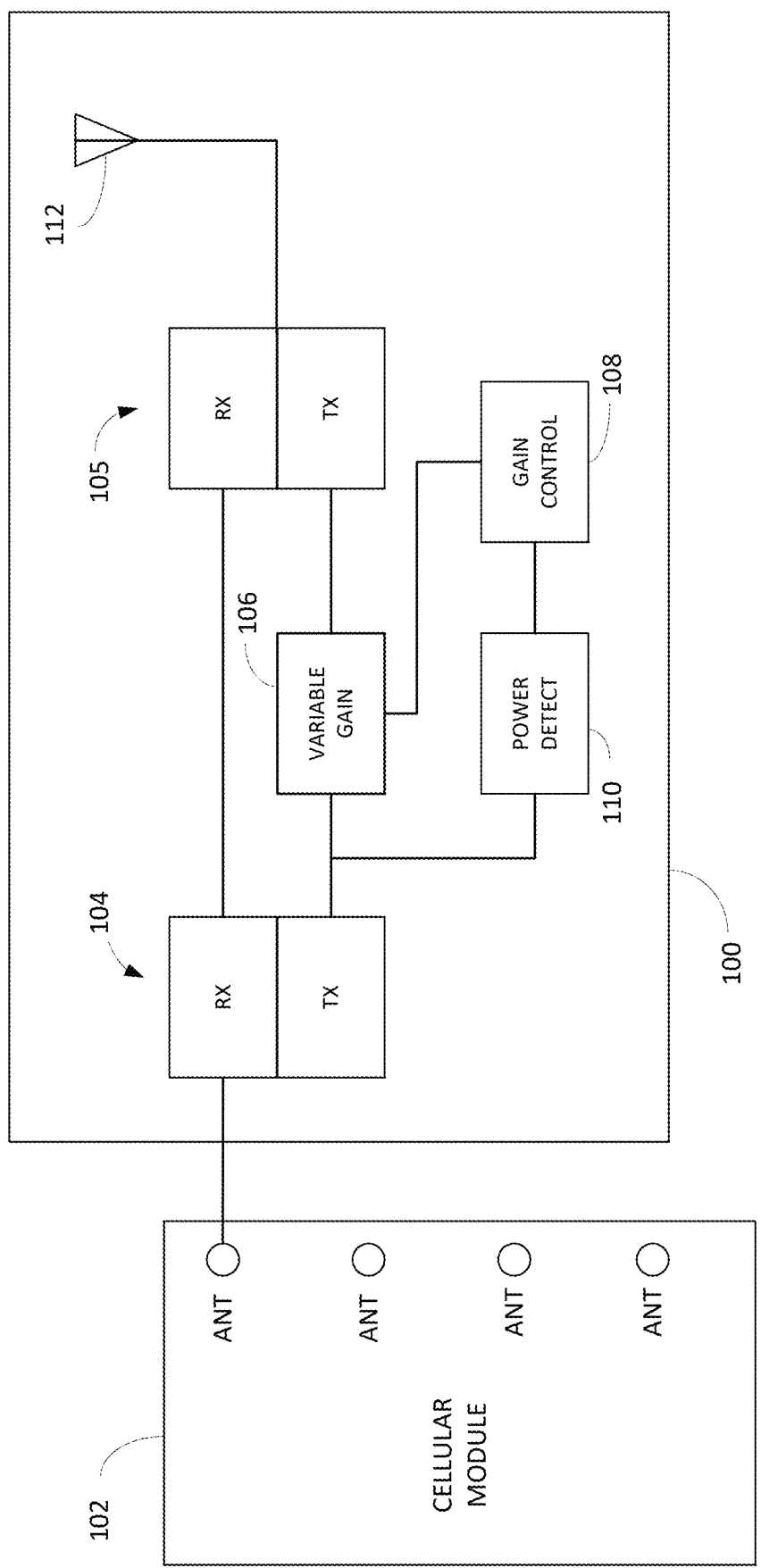
FIG. 1 illustrates a system for enabling high power user equipment capabilities.

FIG. 1 illustrates one preferred implementation of a system 100 for enabling high power user equipment (HPUE) within a wireless communication system 10. The input to the system 100 is directly connected to an antenna output from a standard cellular module 102, such as a cellular modem. A first stage 104 of the system 100 splits the Receive (RX) and Transmit (TX) paths using a device such as a RF duplexer. In some implementations, this may not be needed if, for example, the output from the cellular module is a Transmit only output or if the system chooses not to use the RX path.

As discussed above, an RF duplexer or similar device splits the TX and RX paths to isolate the transmit signal for processing. If the cellular module provides a TX-only output or if the RX path is not needed, this step can be omitted. In most cases, the Rx path is preserved and routed through the system unchanged to maintain full duplex communication.

Typically, the Receive path is needed and passes through the system as shown in FIG. 1. The TX output from the cellular module becomes an input into a variable gain amplifier stage 106. The gain of the variable amplifier is controlled by a gain control system 108. The gain control system 108 has at least one input which is the input power going into the variable gain amplifier 106. This input power can be measured with a power detector 110 or other means.

The core of the system is the variable gain amplifier (VGA) that processes the TX signal. The VGA increases the signal's power by applying a controlled amount of gain, enabling the module to transmit at higher power levels than its native capability. The gain can be implemented using various techniques, such as a gain block paired with variable attenuators, as referenced in prior disclosures (U.S. patent application Ser. Nos. 18/641,131 and 18/387,430). This allows precise control over the output power.

Note that the variable gain amplifier 106 may be implemented in a number of different ways, including a gain block with variable attenuators such as described in the patent disclosures incorporated by reference herein. The output of the variable gain amplifier 106 is then connected to an antenna 112, potentially after being combined with the RF path again in a second stage 105 of RX/TX paths. Note that it is possible that multiple RF bands may be present at the output of the cellular module 102, and that additional filtering and combining can be used to isolate the frequency band of interest and combine it again.

In some implementations, the system 100 can be developed into a compact, low-cost implementations for integration into small form-factor devices like wearables or embedded modules. Miniaturizing the design of the system to a compact, low-cost implementation can be suitable for integration into small form-factor devices like wearables or embedded modules. In yet other implementations, machine learning or real-time feedback from the network can be incorporated into the system and method to optimize gain application based on environmental conditions or network load. Additionally, the system and method can be extended to support advanced 5G NR features, such as beamforming or carrier aggregation, to further enhance performance.

Figure 2:
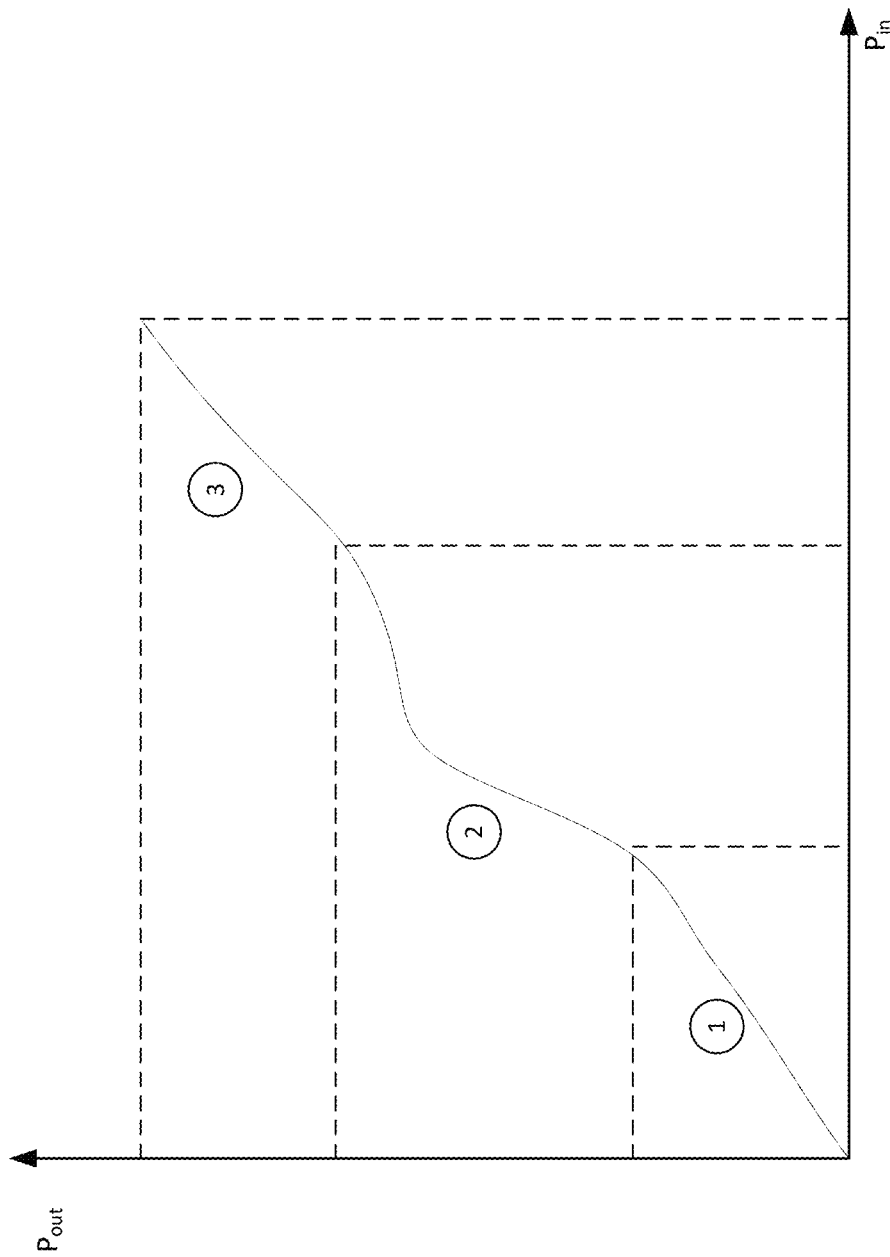
FIG. 2 illustrates a gain control method in accordance with implementations described herein.

In addition to the input-output power relationship, the system controls the rate at which gain is introduced. This is a key that ensures compatibility with the cellular network's power control dynamics. Instead of applying gain instantaneously, the system introduces it gradually over a defined period (e.g., tens to hundreds of milliseconds). This slow rate mimics environmental signal fluctuations, preventing the base station from detecting the gain as an anomaly. For example, the system might increase gain in discrete steps (e.g., 1 dB every 50 ms) until the desired output power is reached, maintaining stable network operation One example of a method consistent with the present disclosure, in the form of a gain control algorithm, is shown in FIG. 2. In region (1), there is nominally a 1:1 ration of output power vs input power. In other words, the added HPA system 100 described in FIG. 1 has no effect. When the input power increases and falls into region (2), a different input to output relationship is used. For example, for each 1 dBm in input power over a threshold, the output increases 2 dBm. In other words, the system adds gain and output power to the transmit signal. This behavior continues until region (3) is entered, where the input to output power relationship typically becomes 1:1 again. As an example, the input:output ratio can be illustrated as in the table below:

| Pin (dBm) | Pout (dBm) |
|---|---|
| −2 | −2 |
| −1 | −1 |
| 0 | 0 |
| 1 | 1 |
| 2 | 3 |
| 3 | 5 |
| 4 | 7 |
| 5 | 9 |
| 6 | 10 |
| 7 | 11 |
| 8 | 12 |

-continued

| Pin (dBm) | Pout (dBm) |
|---|---|
| 9 | 13 |
| 10 | 14 |
| 11 | 15 |
| 12 | 16 |
| 13 | 18 |
| 14 | 20 |
| 15 | 22 |
| 16 | 24 |
| 17 | 25 |
| 18 | 26 |
| 19 | 27 |
| 20 | 28 |
| 21 | 29 |
| 22 | 30 |
| 23 | 31 |

In alternative implementations, in addition to the input vs. output relationship being controlled, the rate at which additional gain is introduced into the system may also be controlled. For example, it is possible to add additional gain in defined steps at a defined rate. Whereas the nominal system would have 0 dB of gain, additional gain may be introduced over a period of time that is slow enough such that the system operation is not adversely impacted.

The present system and method provide a number of advantages. By avoiding modifications to the cellular module's software or firmware, the system can be applied to a wide range of existing devices, reducing development costs and time-to-market. The ability to achieve Power Class 1 transmit power levels extends the range and reliability of cellular connections, particularly in challenging environments such as rural areas, urban canyons, or inside buildings. Further, the slow gain application rate ensures that the system operates transparently within the cellular network, avoiding disruptions to power control loops or triggering network penalties.

The system supports multiple RF bands and can be adapted to various cellular standards (e.g., LTE, 5G NR, etc.), making it suitable for diverse applications. By being configured to apply gain only when needed (such as illustrated in Region 2 of FIG. 2), the system minimizes power consumption at lower transmit levels, preserving battery life in portable and other devices.

The present system and method has applicability in a number of wireless communication systems: portable wireless access points (WAPs) for enhancing the range and throughput of mobile hotspots, enabling better connectivity for multiple users in remote or underserved areas; and IoT devices for improving the reliability of cellular-connected IoT devices, such as smart meters, environmental sensors, or asset trackers, in low-coverage areas.

The present system and method can also support vehicle-to-everything (V2X) communication systems (such as in automobiles, buses, trains, etc.). The system and method can be used for enabling first responders to maintain reliable communication in disaster zones or areas with poor network coverage, leveraging HPUE capabilities for mission-critical applications. For fixed wireless access points, the system and method can be used for enhancing customer premises equipment (CPE) for broadband access in rural or suburban areas, where higher transmit power can compensate for weak base station signals.

Although a few embodiments have been described in detail above, other modifications are possible. Other embodiments may be within the scope of the following claims.

The invention claimed is:

1. A system for enabling high power user equipment (HPUE) capabilities in a wireless communication device, the system comprising:
a cellular module configured to output a transmit signal at a standard power level;
a variable gain amplifier stage coupled to an antenna output of the cellular module, the variable gain amplifier stage configured to amplify the transmit signal;
a gain control system coupled to the variable gain amplifier stage, the gain control system configured to adjust a gain of the variable gain amplifier stage based on an input power of the transmit signal, wherein the gain is adjusted at a rate slower than a power control loop between the cellular module and a base station, wherein the gain control system is configured to introduce additional gain in defined steps at a predetermined rate to avoid adverse impact on system operation; and
an antenna coupled to an output of the variable gain amplifier stage, the antenna configured to transmit the amplified transmit signal.

2. The system of claim 1, further comprising an RF duplexer configured to separate a receive path and a transmit path from the antenna output of the cellular module, wherein the transmit path is input to the variable gain amplifier stage.

3. The system of claim 1, wherein the gain control system includes a power detector configured to measure the input power of the transmit signal to the variable gain amplifier stage.

4. The system of claim 1, wherein the variable gain amplifier stage includes a variable attenuator configured to adjust the gain of the transmit signal.

5. The system of claim 1, wherein the gain control system is configured to apply a first input-to-output power ratio in a first power region, a second input-to-output power ratio in a second power region, and a third input-to-output power ratio in a third power region, wherein the second input-to-output power ratio provides increased gain compared to the first and third input-to-output power ratios.

6. The system of claim 5, wherein the second input-to-output power ratio is configured such that a 1 dBm increase in input power results in a 2 dBm increase in output power.

7. The system of claim 1, further comprising a filter configured to isolate a frequency band of interest from multiple RF bands present at the antenna output of the cellular module.

8. The system of claim 1, wherein the system is configured to operate with standard cellular modem software and firmware of the cellular module without modification.

9. A system for enabling high power user equipment (HPUE) capabilities in a wireless communication device, the system comprising:
a cellular module configured to output a transmit signal at a standard power level;
a variable gain amplifier stage coupled to an antenna output of the cellular module, the variable gain amplifier stage configured to amplify the transmit signal;
a gain control system coupled to the variable gain amplifier stage, the gain control system configured to adjust a gain of the variable gain amplifier stage based on an input power of the transmit signal, wherein the gain is adjusted at a rate slower than a power control loop between the cellular module and a base station; and
an antenna coupled to an output of the variable gain amplifier stage, the antenna configured to transmit the amplified transmit signal,
wherein the system is configured to emulate the effect of multipath fading on the transmit signal by adjusting the gain at the rate slower than the power control loop.

10. The system of claim 9, wherein the gain control system is configured to introduce additional gain in defined steps at a predetermined rate to avoid adverse impact on system operation.

11. The system of claim 9, further comprising a filter configured to isolate a frequency band of interest from multiple RF bands present at the antenna output of the cellular module.

12. A method for enabling high power user equipment (HPUE) capabilities in a wireless communication device, comprising:
receiving a transmit signal from an antenna output of a cellular module, the cellular module operating with standard cellular modem software and firmware;
measuring an input power of the transmit signal;
adjusting a gain of a variable gain amplifier stage based on the measured input power, wherein the gain is adjusted at a rate slower than a power control loop between the cellular module and a base station, wherein adjusting the gain comprises introducing additional gain in defined steps at a predetermined rate to avoid adverse impact on system operation;
amplifying the transmit signal using the variable gain amplifier stage; and
transmitting the amplified transmit signal via an antenna.

13. The method of claim 12, further comprising separating a receive path and a transmit path from the antenna output of the cellular module using an RF duplexer, wherein the transmit path is provided to the variable gain amplifier stage.

14. The method of claim 12, wherein measuring the input power comprises using a power detector coupled to the variable gain amplifier stage.

15. The method of claim 12, wherein adjusting the gain comprises applying a first input-to-output power ratio in a first power region, a second input-to-output power ratio in a second power region, and a third input-to-output power ratio in a third power region, wherein the second input-to-output power ratio provides increased gain compared to the first and third input-to-output power ratios.

16. The method of claim 15, wherein the second input-to-output power ratio is configured such that a 1 dBm increase in input power results in a 2 dBm increase in output power.

17. The method of claim 12, further comprising filtering the transmit signal to isolate a frequency band of interest from multiple RF bands present at the antenna output of the cellular module.

18. A method for enabling high power user equipment (HPUE) capabilities in a wireless communication device, comprising:
receiving a transmit signal from an antenna output of a cellular module, the cellular module operating with standard cellular modem software and firmware;
measuring an input power of the transmit signal;
adjusting a gain of a variable gain amplifier stage based on the measured input power, wherein the gain is adjusted at a rate slower than a power control loop between the cellular module and a base station;
amplifying the transmit signal using the variable gain amplifier stage; and
transmitting the amplified transmit signal via an antenna, wherein adjusting the gain at the rate slower than the power control loop emulates the effect of multipath fading on the transmit signal.

19. The method of claim 18, further comprising introducing additional gain in defined steps at a predetermined rate to avoid adverse impact on system operation.

20. The system of claim 18, further comprising isolating, using a filter, a frequency band of interest from multiple RF bands present at the antenna output of the cellular module.

* * * * *